United States Patent
Morgenstern et al.

(10) Patent No.: US 9,715,350 B2
(45) Date of Patent: Jul. 25, 2017

(54) RESERVING A STORAGE AREA AND BUILDING PAGE FRAME TABLE ENTRIES

(71) Applicant: International Business Machines Corporation, Armonk, NY (US)

(72) Inventors: Harris M. Morgenstern, Wappingers Falls, NY (US); Steven M. Partlow, Beacon, NY (US); Scott B. Tuttle, Staatsburg, NY (US); Elpida Tzortzatos, Lagrangeville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/252,414

(22) Filed: Aug. 31, 2016

(65) Prior Publication Data
US 2016/0364168 A1    Dec. 15, 2016

Related U.S. Application Data

(63) Continuation of application No. 15/135,924, filed on Apr. 22, 2016, now Pat. No. 9,483,394, which is a continuation of application No. 14/736,849, filed on Jun. 11, 2015.

(51) Int. Cl.
| | |
|---|---|
| *G06F 12/00* | (2006.01) |
| *G06F 3/06* | (2006.01) |
| *G06F 12/02* | (2006.01) |
| *G06F 12/1036* | (2016.01) |
| *G06F 12/1009* | (2016.01) |
| *G06F 12/1027* | (2016.01) |
| *G06F 9/44* | (2006.01) |

(52) U.S. Cl.
CPC .......... *G06F 3/0631* (2013.01); *G06F 3/0604* (2013.01); *G06F 3/0673* (2013.01); *G06F 9/4401* (2013.01); *G06F 12/023* (2013.01); *G06F 12/1009* (2013.01); *G06F 12/1027* (2013.01); *G06F 12/1036* (2013.01); *G06F 2212/1044* (2013.01); *G06F 2212/657* (2013.01); *G06F 2212/68* (2013.01)

(58) Field of Classification Search
None
See application file for complete search history.

(56) References Cited

U.S. PATENT DOCUMENTS

| | | |
|---|---|---|
| 5,765,210 A | 6/1998 | Greenstein et al. |
| 2014/0201496 A1* | 7/2014 | Foster .................... G06F 12/08 711/209 |

* cited by examiner

*Primary Examiner* — Baboucarr Faal
(74) *Attorney, Agent, or Firm* — Cantor Colburn LLP

(57) ABSTRACT

In one embodiment, a computer-implemented method includes receiving a large frame area (LFAREA) request, including a request for a plurality of page frame table entries (PFTEs) to back a plurality of frames in an LFAREA of main memory. Each of the plurality of frames has one of a first size and a second size, where the second size is larger than the first size. The method further includes counting how many frames in the main memory have yet to be initialized and have one of the first size and the second size. A size needed for the plurality of PFTEs is calculated, based at least in part on the counting. A storage area is reserved for the plurality of PFTEs, by a computer processor, where a size of the storage area is the size calculated based at least in part on the counting.

1 Claim, 3 Drawing Sheets

RESERVING A STORAGE AREA AND BUILDING PAGE FRAME TABLE ENTRIES

DOMESTIC PRIORITY

This application is a continuation of and claims priority from U.S. patent application Ser. No. 15/135,924, filed Apr. 22, 2016, which in turn claims priority from U.S. patent application Ser. No. 14/736,849, filed on Jun. 11, 2015, the entire contents of all of the applications listed above are incorporated herein by reference.

BACKGROUND

Various embodiments of this disclosure relate to page frame tables and, more particularly, to reserving a storage area and building page frame table entries.

A computer's operating system manages its virtual memory and main memory. Virtual memory pages are assigned to applications and backed by (i.e., stored in) main memory frames when used. However, portions of main memory are used to back a range of virtual memory that keeps track of the main memory. This range of virtual memory contains page frame table entries (PFTEs).

During system initialization, frames are needed to back PFTEs used to represent main memory, including the 1 MB and 2 GB storage frames in the large frame area (LFAREA), a portion of main memory. The needed frames are obtained from an area of main memory that is initialized to support other early initialization processes. When the LFAREA is specified to be large, this area for early frames becomes exhausted as the frames needed to back the PFTEs are taken. This causes system initialization to fail.

Some systems use a technique of backing the PFTEs in the same address increment that contains the storage the PFTEs represent. This technique, referred to herein as the zone technique, is performed by using the first (i.e., lowest address) 4 KB frame in the address increment to back the first page of PFTEs that represents the backing frame itself, and then working upward by adding more PFTEs to represent each of the succeeding 4 KB frames.

SUMMARY

In one embodiment of this disclosure, a computer-implemented method includes receiving a large frame area (LFAREA) request, including a request for a plurality of page frame table entries (PFTEs) to back a plurality of frames in an LFAREA of main memory. Each of the plurality of frames has one of a first size and a second size, where the second size is larger than the first size. The method further includes counting how many frames in the main memory have yet to be initialized and have one of the first size and the second size. A size needed for the plurality of PFTEs is calculated, based at least in part on the counting. A storage area is reserved for the plurality of PFTEs, by a computer processor, where a size of the storage area is the size calculated based at least in part on the counting.

In another embodiment, a system includes a memory and one or more computer processors communicatively coupled to the memory. The one or more computer processors are configured to receive an LFAREA request, including a request for a plurality of PFTEs to back a plurality of frames in an LFAREA of main memory. Each of the plurality of frames has one of a first size and a second size, where the second size is larger than the first size. The one or more computer processors are further configured to count how many frames in the main memory have yet to be initialized and have one of the first size and the second size. The one or more computer processors are further configured to calculate a size needed for the plurality of PFTEs, based at least in part on the counting. The one or more computer processors are further configured to reserve a storage area for the plurality of PFTEs, where a size of the storage area is the size calculated based at least in part on the counting.

In yet another embodiment, a computer program product for reserving a storage area in which to build page frame table entries includes a computer readable storage medium having program instructions embodied therewith. The program instructions are executable by a processor to cause the processor to perform a method. The method includes receiving an LFAREA request, including a request for a plurality of PFTEs to back a plurality of frames in an LFAREA of main memory. Each of the plurality of frames has one of a first size and a second size, where the second size is larger than the first size. The method further includes counting how many frames in the main memory have yet to be initialized and have one of the first size and the second size. Further according to the method, a size needed for the plurality of PFTEs is calculated, based at least in part on the counting. A storage area is reserved for the plurality of PFTEs, where a size of the storage area is the size calculated based at least in part on the counting.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Various embodiments of this disclosure calculate a size needed for page frame table entries (PFTEs) for a large frame area (LFAREA), reserve the calculated amount of space in a special area, or areas, of contiguous storage outside the area normally used for initialization storage, and build the PFTEs in the reserved area.

The zone technique of backing page frame table entries (PFTEs) is not a viable solution for the LFAREA because 2 GB pages in address increments that are 2 GB in size leave no space for the PFTEs, and address increments larger than 2 GB (e.g., 4 GB) would fragment the address increment such that the address increment will hold fewer 2 GB pages, given that a small part of a possible 2 GB page would need to be used to back the PFTEs.

According to some embodiments of this disclosure, however, a storage-management system may avoid exhausting the storage area used for backing early frames, and may thus avoid initialization failure. Further, the ability to back the PFTEs in contiguous storage areas may reduce storage fragmentation.

It will be understood that techniques according to this disclosure need not be limited to backing PFTEs for the LFAREA. Rather, some embodiments may be applicable to other storage areas represented by PFTEs that need to be backed in an area outside the area used by default during system initialization.

Figure 1:
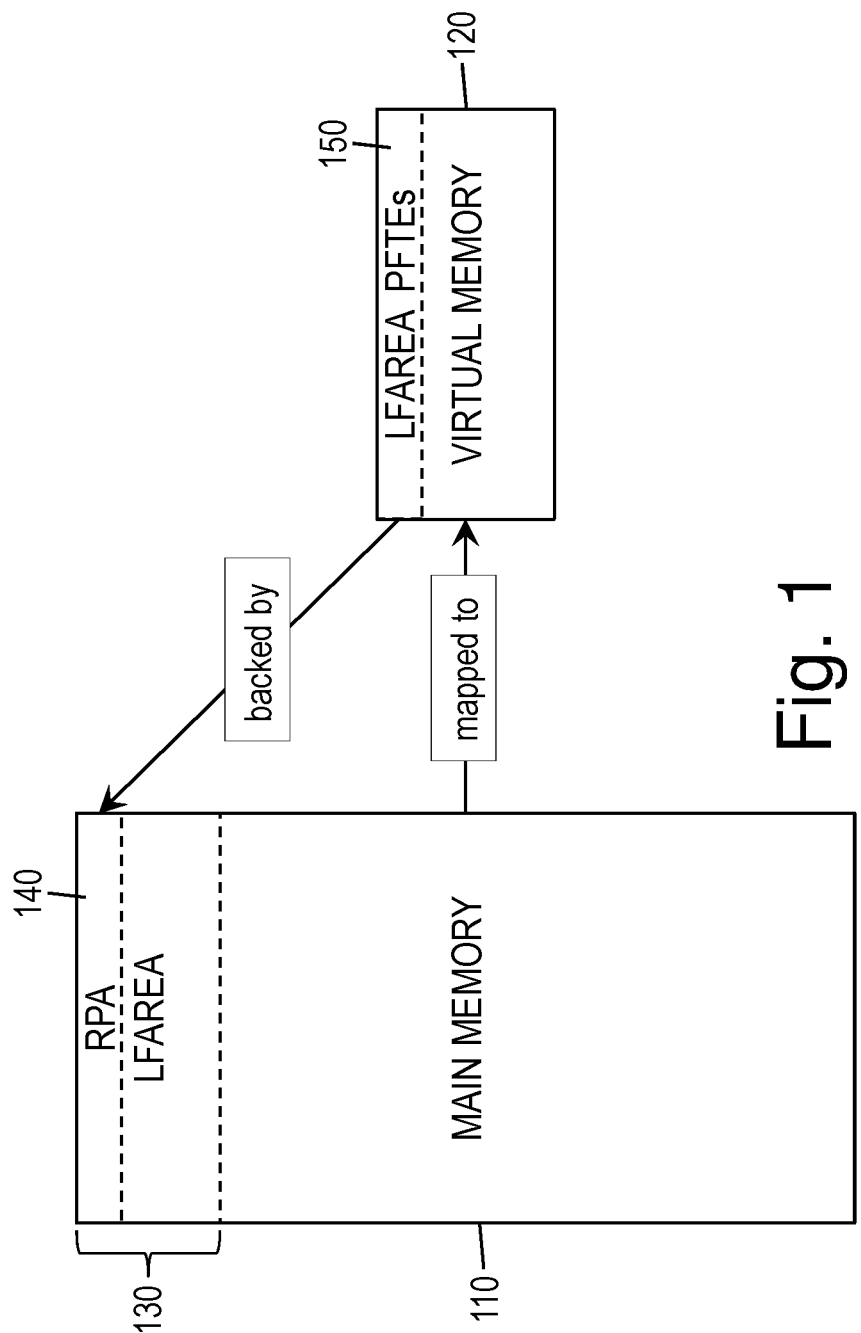
FIG. 1 is a block diagram of a storage-management system, according to some embodiments of this disclosure.

FIG. 1 is a block diagram of a storage-management system 100, configured to reserve a storage area for backing PFTEs for the LFAREA and to build the PFTEs in that reserved storage area, according to some embodiments of this disclosure. The storage-management system 100 may reside in a computer system 300, such as the one illustrated in FIG. 3. As shown in FIG. 1, main memory 110, or physical memory, of the computer system 300 may be mapped to PFTEs 150 in a portion of virtual memory 120. The main memory 110 may include an LFAREA 130. During initialization, the storage-management system 100 may establish a reserved PFTE area (RPA) 140 in the main memory 110, used as a space in which to back PFTEs 150 for the LFAREA 130, so as to establish virtual-to-physical mappings for the LFAREA.

Figure 2:
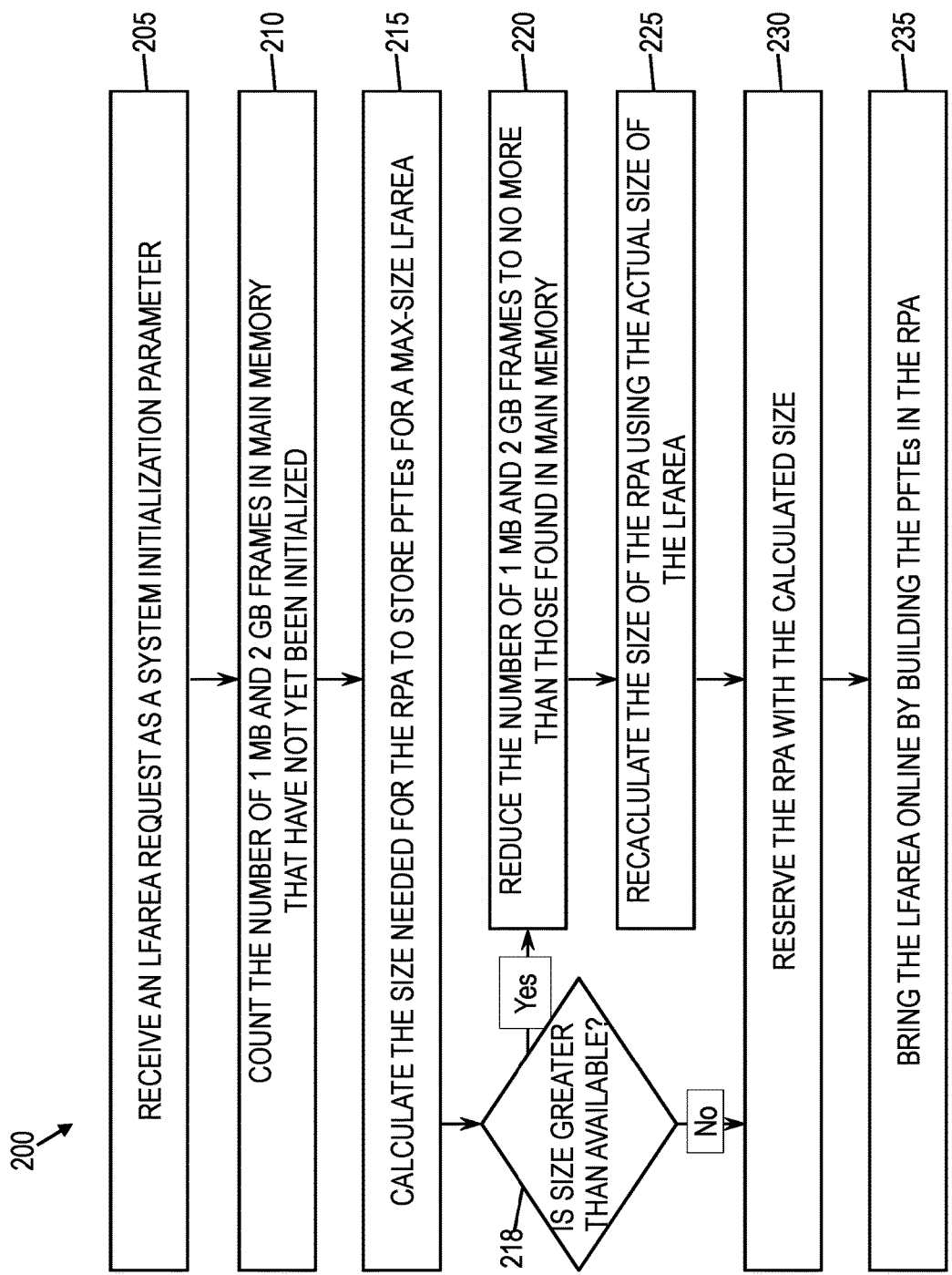
FIG. 2 is a flow diagram of a method for reserving a storage area and building page frame table entries for a large frame area, according to some embodiments of this disclosure.

FIG. 2 is a flow diagram of a method 200 for reserving the RPA 140 and building PFTEs 150 for the LFAREA 130, according to some embodiments of this disclosure. As shown, at block 205, an LFAREA request may be received, specified as a system initialization parameter. In some embodiments, the LFAREA request may include a minimum count and maximum count for 1 MB frames requested as well as a minimum and maximum count for 2 GB frames requested. At block 210, the storage-management system 100 may count the number of 1 MB and 2 GB frames that have yet to be initialized in main memory 110. This count may be used to determine how many frames of each size are available toward satisfying the LFAREA request. In some embodiments, blocks 210 and 215 may be swapped.

At block 215, the storage-management system 100 may calculate the maximum size needed for the PFTEs 150 for the LFAREA 130 based on a maximum possible size, M, of the LFAREA in megabytes. The maximum possible size M of the LFAREA may be calculated based on the maximum counts of 1 MB and 2 GB frames specified in the LFAREA request. The PFTEs 150 of the RPA 140 may be stored in 1 MB frames, so this calculation may include calculating the number of 1 MB frames needed for the RPA 140.

The number of PFTEs 150 needed may include those for the LFAREA storage and those for the RPA 140 itself. The amount of storage needed to store the PFTEs 150 may be 1/64 of the LFAREA storage, which is based on the ratio of 4 KB frames to the size of a PFTE 150. Because a little more space is needed for each successive set of PFTEs 150 for the previous area, the total storage space to be reserved may be calculated by using a geometric series, as follows, where S is the size of the RPA in megabytes:

$$S = \frac{M}{64} + \frac{M}{64^2} + \frac{M}{64^3} + \ldots + \frac{M}{64^4}.$$

This can be rewritten as follows:

$$S = \frac{M*\left(\frac{1}{64} - \left(\frac{1}{64}\right)^n\right)}{1 - \frac{1}{64}}.$$

The above can be generalized for ratios r that need not equal 1/64, as follows:

$$S = \frac{M*(r - r^n)}{1 - r}.$$

As n approaches infinity with r=1/64, the above formula converges to M/63.

Thus, the storage-management system 100 may reserve an RPA 140 with a size equal to 1/63 of the LFAREA size. In addition to PFTEs 150 in the RPA 140, the storage-management system 100 may also require page tables for those PFTEs 150. The page tables may be used at a ratio of 1 page table per segment of storage, or 2048 bytes per 1 MB of the PFTE storage, which is a ratio of 1/512.

The above formula uses the maximum size of the LFAREA 130 to determine the size of the RPA 140, but the storage-management system 100 may also use the RPA 140 to determine the size of the page table storage. The size of the RPA 140 may be based on the maximum size M of the LFAREA in megabytes, so the storage for the PFTEs 150 and the page tables may be:

$$\sum_{n=1}^{\infty} \frac{M}{64^n} + \frac{1}{512} * \frac{M}{64^n}.$$

This formula can be rearranged as:

$$\sum_{n=1}^{\infty} \frac{513}{512} M * \left(\frac{1}{64}\right)^n.$$

It thus follows that, according to some embodiments, the size S of the RPA 140 may be:

$$S = \frac{M}{64} + \frac{M}{64^2} + \frac{M}{64^3} + \ldots + \frac{M}{64^{n-1}},$$

and $$S = \frac{\frac{513}{512}M - \left(\frac{1}{64}\right)^n}{1 - \frac{1}{64}}.$$

The above can be generalized for ratios r that need not equal 1/64, and for values of the variable u that need not equal (513/512)*M, as follows:

$$S = \frac{u(r - r^n)}{1 - r}.$$

As n approaches infinity, for r=1/64 and u=(513/512)*M, the above formula converges to:

$$S = M\frac{513}{612*63} = M\frac{513}{32,256} = M\frac{57}{3584}$$

When floating-point math is not used, the storage-management system 100 may add 1 to this final value to round up the result, so as to account for any fractional amount that is truncated. The resulting value of S, the size of the RPA 140, may be slightly larger than required to store the PFTEs 150. After the LFAREA 130 is brought online, unused frames of the RPA 140 may be freed for other use.

Referring again to FIG. 2, at decision block 218, it may be determined whether the calculated size of the LFAREA 130 and the RPA 140 is greater than the available main memory 110 calculated in block 210. If not, then the storage-management system 100 may skip to block 230. However, if the calculated size is greater than the calculated main memory 110, then at block 220, the storage-management system 100 may reduce the number of 1 MB frames and 2 GB frames to be included in the LFAREA 130. In this case, there are not enough real frames in main memory 110 to satisfy the maximum size of the LFAREA 130. Thus, the size of the LFAREA 130 may be reduced to match the available space for the LFAREA 130 in the main memory 110. When the reduction is performed, this reduced size may then be the size of the LFAREA used in later calculations, which may be the sum of the 1 MB and 2 GB frames identified in the main memory 110. This size may be used to determine whether the LFAREA request can be satisfied within the minimum and maximum bounds specified on the LFAREA request.

At block 225, after the size of the LFAREA 130 is reduced, the storage-management system 100 may recalculate the size of the RPA 140 using the reduced size of the LFAREA 130. This calculation may be the same as described above, except with the reduced size L of the LFAREA replacing the maximum size M.

At block 230, the storage-management system 100 may reserve the RPA 140 based on the LFAREA size calculated above, which may either be the reduced size or the maximum size. This may be performed by scanning from the top of main memory 110, looking for available 1 MB frames for storing the PFTEs 150. As each span of frames (i.e., contiguous group of frames) is discovered, that span of frames may be marked as being part of the LFAREA 130, and a reserved PFTE area descriptor (RPAD) may be built and associated with the span of frames. The RPAD may describe the start (i.e., lowest) address of the span of frames and the number of frames reserved for the RPA 140 in the corresponding span of frames. Depending on where the available 1 MB frames are found, there may be one or more such RPADs built and queued, in some cases skipping over offline address increments or 2 GB spans of frames that are to be reserved for the 2 GB pages requested in the LFAREA request.

At block 235, the RPADs that were built may be used to bring the LFAREA 130 online by backing PFTEs 150 with the RPA 140. In some embodiments, each RPA section represented by, and corresponding to, an RPAD may be built from the bottom (i.e., lowest address) upward. The first and lowest frame may be used to back the PFTE 150 that describes the frame for maintaining the PFTEs 150, and each subsequent PFTE 150 placed in that frame may be used to map subsequent frames of the RPA 140 and the LFAREA 130. This may be similar to the zone technique described above, except that the lowest address where the first PFTE 150 begins may be the lowest address of the applicable RPA 140 and not the lowest address of the address increment.

Figure 3:
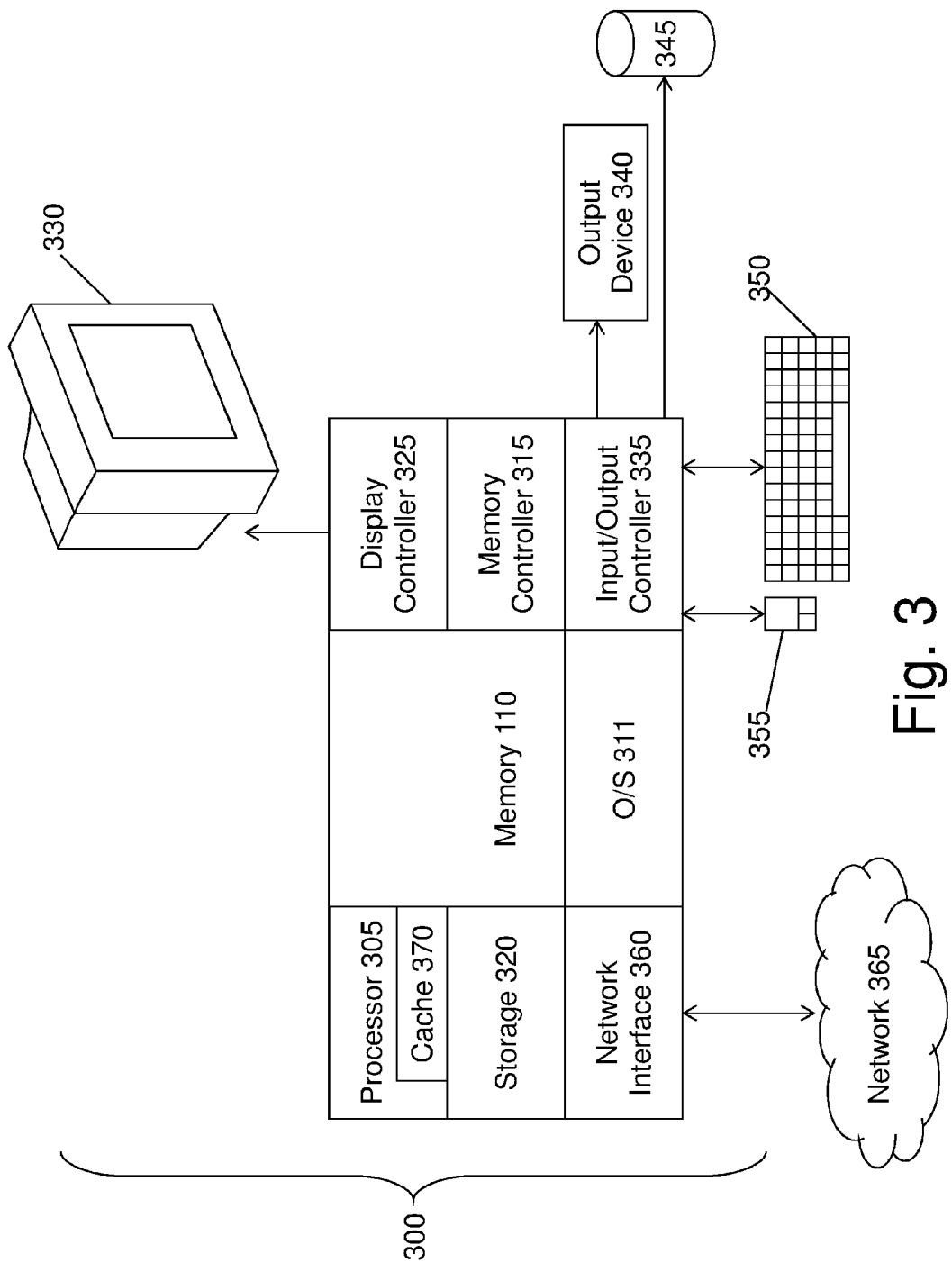
FIG. 3 is a block diagram of a computer system for implementing some or all aspects of the storage-management system, according to some embodiments of this disclosure.

FIG. 3 illustrates a block diagram of a computer system 300 for use in implementing a storage-management system or method according to some embodiments. The storage-management systems and methods described herein may be implemented in hardware, software (e.g., firmware), or a combination thereof. In some embodiments, the methods described may be implemented, at least in part, in hardware and may be part of the microprocessor of a special or general-purpose computer system 300, such as a personal computer, workstation, minicomputer, or mainframe computer.

In some embodiments, as shown in FIG. 3, the computer system 300 includes a processor 305, main memory 110 coupled to a memory controller 315, and one or more input devices 345 and/or output devices 340, such as peripherals, that are communicatively coupled via a local I/O controller 335. These devices 340 and 345 may include, for example, a printer, a scanner, a microphone, and the like. Input devices such as a conventional keyboard 350 and mouse 355 may be coupled to the I/O controller 335. The I/O controller 335 may be, for example, one or more buses or other wired or wireless connections, as are known in the art. The I/O controller 335 may have additional elements, which are omitted for simplicity, such as controllers, buffers (caches), drivers, repeaters, and receivers, to enable communications.

The I/O devices 340, 345 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 305 is a hardware device for executing hardware instructions or software, particularly those stored in main memory 110. The processor 305 may be a custom made or commercially available processor, a central processing unit (CPU), an auxiliary processor among several processors associated with the computer system 300, a semiconductor based microprocessor (in the form of a microchip or chip set), a macroprocessor, or other device for executing instructions. The processor 305 includes a cache 370, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 370 may be organized as a hierarchy of more cache levels (L1, L2, etc.).

The main memory 110 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the main memory 110 may incorporate electronic, magnetic, optical, or other types of storage media. Note that the main memory 110 may have a distributed architecture, where various components are situated remote from one another but may be accessed by the processor 305.

The instructions in main memory 110 may include one or more separate programs, each of which comprises an ordered listing of executable instructions for implementing logical functions. In the example of FIG. 3, the instructions in the main memory 110 include a suitable operating system (OS) 311. The operating system 311 essentially may control the execution of other computer programs and provides scheduling, input-output control, file and data management, memory management, and communication control and related services.

Additional data, including, for example, instructions for the processor 305 or other retrievable information, may be stored in storage 320, which may be a storage device such as a hard disk drive or solid state drive. The stored instructions in main memory 110 or in storage 320 may include those enabling the processor to execute one or more aspects of the storage-management systems and methods of this disclosure.

The computer system 300 may further include a display controller 325 coupled to a display 330. In some embodiments, the computer system 300 may further include a network interface 360 for coupling to a network 365. The network 365 may be an IP-based network for communication between the computer system 300 and an external server, client and the like via a broadband connection. The network 365 transmits and receives data between the computer system 300 and external systems. In some embodiments, the network 365 may be a managed IP network administered by a service provider. The network 365 may be implemented in a wireless fashion, e.g., using wireless protocols and technologies, such as WiFi, WiMax, etc. The network 365 may also be a packet-switched network such as a local area network, wide area network, metropolitan area network, the Internet, or other similar type of network environment. The network 365 may be a fixed wireless network, a wireless local area network (LAN), a wireless wide area network (WAN) a personal area network (PAN), a virtual private network (VPN), intranet or other suitable network system and may include equipment for receiving and transmitting signals.

Storage-management systems and methods according to this disclosure may be embodied, in whole or in part, in computer program products or in computer systems 300, such as that illustrated in FIG. 3.

Technical effects and benefits of some embodiments include the ability to prevent the initialization failure that can result from space exhaustion when building PFTEs 150 for the LFAREA 130. Some embodiments of the storage-management system 100 may avoid this space exhaustion by calculating how much storage space will be needed for the PFTEs 150 and then reserving that space for building the PFTEs 150.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving a large frame area (LFAREA) request, comprising a request for a plurality of page frame table entries (PFTEs) to back a plurality of frames in an LFAREA of main memory, wherein each of the plurality of frames has one of a first size and a second size, the second size being larger than the first size;
   determining available main memory by counting how many frames in the main memory have yet to be initialized and have one of the first size and the second size;
   calculating an actual size of a reserved PFTE area (RPA) to store the plurality of PFTEs, based at least in part on the counting, wherein the calculating the size needed for the RPA comprises:
      receiving, in the LFAREA request, bounds for the size of the LFAREA;
      calculating a maximum size of the LFAREA based on the bounds;
      calculating a maximum size of the RPA, based on the maximum size of the LFAREA;
      determining that the maximum size of the LFAREA plus the maximum size of the RPA is greater than the available main memory determined by the counting;
      determining the actual size of the LFAREA, wherein the actual size of the LFAREA is based on the counting, responsive to the maximum size of the LFAREA plus the maximum size of the RPA being greater than the available main memory; and
      calculating the actual size of the RPA based on the actual size of the LFAREA; and
   building, by a computer processor, the RPA with the actual size of the RPA by storing the plurality of PFTEs in the RPA.

* * * * *